United States Patent
Tappan et al.

(10) Patent No.: US 10,446,014 B1
(45) Date of Patent: Oct. 15, 2019

(54) ALARM NOTIFICATION DELAY

(71) Applicant: Bently Nevada, LLC, Minden, NV (US)

(72) Inventors: Jacqueline Marie Tappan, Minden, NV (US); Ryan Gregory Roaldson, Minden, NV (US)

(73) Assignee: Bently Nevada, LLC, Minden, NV (US)

( * ) Notice: Subject to any disclaimer, the term of this patent is extended or adjusted under 35 U.S.C. 154(b) by 0 days.

(21) Appl. No.: 16/020,528

(22) Filed: Jun. 27, 2018

(51) Int. Cl.
*G08B 25/00* (2006.01)

(52) U.S. Cl.
CPC .................................. *G08B 25/001* (2013.01)

(58) Field of Classification Search
CPC .................................................. G08B 25/001
USPC ........................................................ 340/527
See application file for complete search history.

(56) References Cited

U.S. PATENT DOCUMENTS

| 5,237,518 | A | * | 8/1993 | Sztipanovits | ...... G05B 23/0248 340/505 |
| 2007/0085676 | A1 | * | 4/2007 | Lee | ........................ G08B 25/08 340/539.18 |
| 2014/0306819 | A1 | * | 10/2014 | Ghosh | ................ G05B 19/4184 340/506 |
| 2015/0161882 | A1 | * | 6/2015 | Lett | ...................... G08B 25/001 340/506 |
| 2015/0379864 | A1 | * | 12/2015 | Janchookiat | ........ H04L 41/0631 340/511 |
| 2016/0300475 | A1 | * | 10/2016 | Childs | .................... G08B 25/00 |
| 2018/0322770 | A1 | * | 11/2018 | Srinivasan | ......... G05B 23/0272 |

* cited by examiner

*Primary Examiner* — Kerri L McNally
(74) *Attorney, Agent, or Firm* — Mintz Levin Cohn Ferris Glovsky and Popeo, P.C.

(57) ABSTRACT

Data can be received indicating an occurrence of an alarm in an industrial machine monitoring system, the alarm triggered in response to machine operation satisfying a condition. A notification plan associated with the alarm can be accessed. The notification plan can specify parameters for contacting a user in response to the occurrence of the alarm. The notification plan can specify a time delay. A notification can be generated after elapse of at least the time delay. The generating can be according to the notification plan. The notification can be provided. Related apparatus, systems, techniques, and articles are also described.

15 Claims, 7 Drawing Sheets

ALARM NOTIFICATION DELAY

BACKGROUND

It can be difficult to manually monitor complex machines that have several moving and/or vibrating parts (e.g., turbines, compressors, and the like). Monitoring systems can be commonly used to monitor the operation of complex machines, and generate alarms when the machine is not operating as desired. Monitoring systems can include sensors to detect operational information (e.g., operating parameters, operational states, and the like) associated with the machines, and relay a signal to a computing device, which can visually present the operational information for a designated personnel. For example, a turbine can include an accelerometer that can monitor the motion of blades of a turbine and relay angular velocity measurements to a computer for visualization.

Operational information of a complex machine can include information related to multiple operational states of the machine and one or more corresponding operational parameters. For example, operational states can include a state in which the machine is starting up or shutting down ("startup-shutdown state"), a state of normal operation ("running state"), a state in which the machine is turned off ("machine off state"), and the like. The operating parameters of the various operational states can include, angular velocity, machine-part vibration rate, overall vibration, temperature, pressure, and the like. As the machine operates, it can transition through multiple operational states and the computing device can be configured to automatically generate alarms to identify undesirable behavior. These alarms can be generated based on alarm triggers or set points, which can include conditions that can be uniquely configured for the different operational states of a machine. Graphical representation of generated alarms, along with operational information of the machine in a graphical display, can be valuable for understanding trends in machine operation.

SUMMARY

However, as the machine transitions through multiple operational states, multiple alarms can be generated. As a result, the number of alarms generated can be high creating significant amounts of work for a user. With increased number of alarms, deciphering operation trends can become challenging.

In an aspect, data can be received indicating an occurrence of an alarm in an industrial machine monitoring system, the alarm triggered in response to machine operation satisfying a condition. A notification plan associated with the alarm can be accessed. The notification plan can specify parameters for contacting a user in response to the occurrence of the alarm. The notification plan can specify a time delay. A notification can be generated after elapse of at least the time delay. The generating can be according to the notification plan. The notification can be provided.

One or more of the following features can be included in any feasible combination. For example, generating the notification can include generating at least one visualization characterizing sensor measurements related to machine operation before and after a time point in which the alarm was triggered. The at least one visualization can be predefined and specified in the notification plan. Processing of the notification can be delayed by at least the time delay. Providing the notification can include transmitting the notification via email, transmitting the notification via text message, or storing the notification in memory.

The industrial machine monitoring system can include a sensor and computing device. The sensor can be coupled to and observing operational information of a machine and relaying the observed operational information to the computing device for storage and analysis. The computing device can compare the operational information to predefined alarm trigger conditions and can generate the alarm in response to the operational information satisfying at least one of the alarm trigger conditions.

After an elapse of time that is at least the time delay, a state of the alarm can be determined. The generating the notification can be in response to determining that the alarm is active.

The notification plan can specify: a recipient of the notification; at least one applicable alarm type; at least one applicable alarm level; a notification suppression time; predefined visualizations for inclusion in the notification; alarm states for canceling the notification; and the time delay. The recipient of the notification can include an email address, a telephone number, or a file path. The at least one applicable alarm type can include machine type and instrumentation type. The at least one applicable alarm level can include a level 1 alarm, a level 2 alarm, a level 3 alarm, and a level 4 alarm. The alarm states for canceling the notification can include acknowledged, shelved, and cleared.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

Like reference labels in the figures indicate like elements.

DETAILED DESCRIPTION

It can be desirable to monitor the operation of a machine (e.g., by a network of sensors) and to notify a user of an undesired behavior in operation of the machine. Monitoring can be done, for example, by triggering an alarm when an undesired behavior of the machine is detected by one or more sensors. When an alarm is triggered, a user can assess the operation of the machine and take remedial steps, if needed. In complex machines, however, manual monitoring of triggered alarms can be difficult. A complex machine can have many operational states, each of which can have many associated operational parameters that can be monitored, and potentially trigger multiple alarms (e.g., alarms that can be associated with both the current and the past operational states of the machine). When many alarms are concurrently active at a time, each of which can require attention from the user, a significant amount of work can be created for the user in analyzing machine operation. Accordingly, an improved machine monitoring system is described that delays notifying a user of the alarm. Delaying notification of one or more alarms can allow for additional data aggregation and analysis of machine operation after the event that triggered the alarm, which increases the information available to a user for assessing a cause and solution to the condition that raised the alarm. This can allow the user to efficiently and effectively resolve problems of the machine. In addition, because it may be possible to clear the alarm automatically based on subsequent action that is taken, delaying notification of the alarm can reduce the number of alarms that a user has to address. In some implementations, the notification can be provided to the user via, e.g., SMS text message, email, or another channel. Other embodiments are within the scope of the disclosure.

Figure 1:
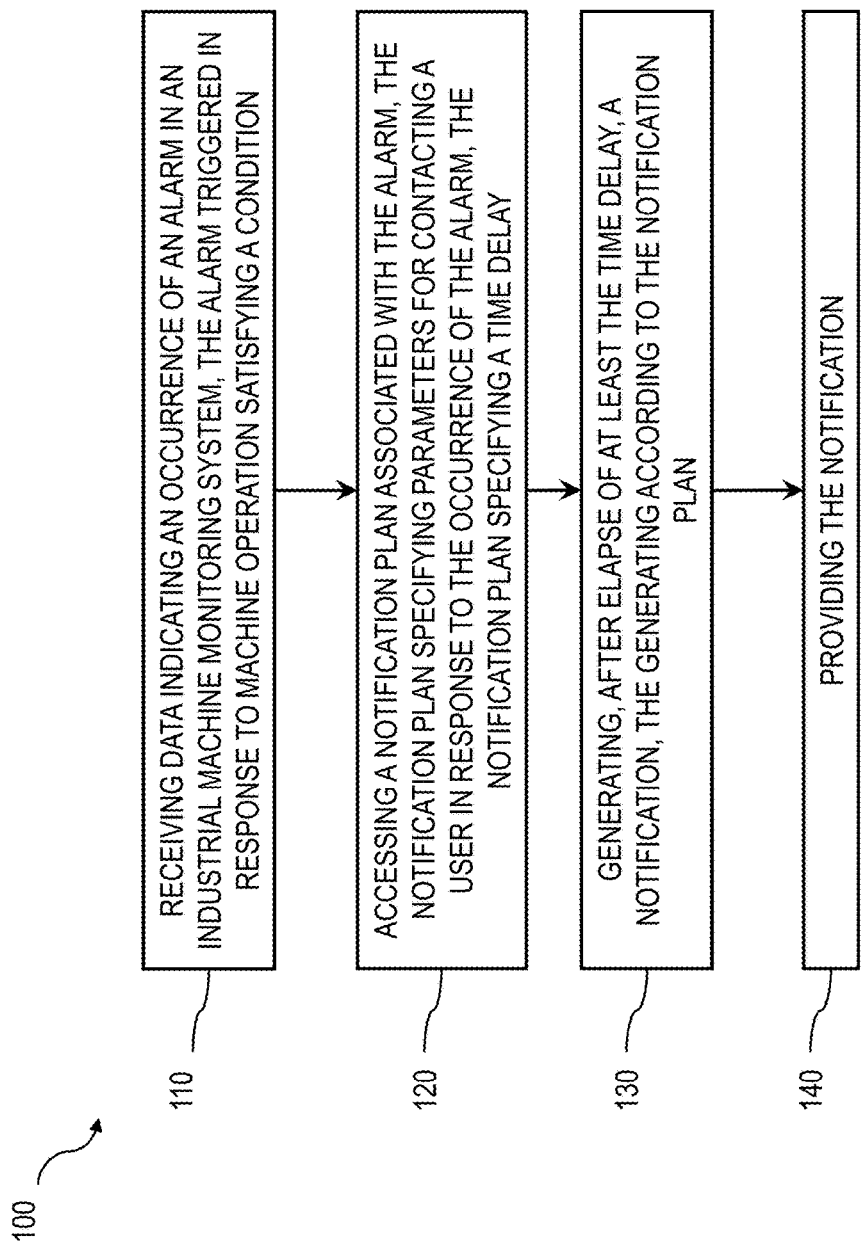
FIG. 1 is a process flow diagram illustrating an example process of providing a delayed alarm notification that can increase the information available to a user for assessing a cause and solution to the condition that raised the alarm.

FIG. 1 is a process flow diagram illustrating an example process 100 of providing a delayed alarm notification that can increase the information available to a user for assessing a cause and solution to the condition that raised the alarm. This can allow the user to efficiently and effectively resolve problems of the machine.

At 110, data can be received indicating an occurrence of an alarm in an industrial machine monitoring system. The alarm can have been triggered in response to machine operation satisfying a predetermined condition, for example, turbine vibration exceeding a predetermined threshold. In some implementations, the machine monitoring system can include a sensor coupled to and observing operational information of a machine and relaying the observed operational information to a computing device for storage and analysis. For example, a vibration sensor can be coupled to a turbine and relay (e.g., transmit) sensor measurements to a remote computing device. The machine monitoring system can compare the operational information to predefined alarm trigger conditions and generate the alarm in response to the operational information satisfying at least one of the alarm trigger conditions. In some implementations, the indication of the occurrence of the alarm can be in the form of an event identifier.

At 120, a notification plan associated with the alarm can be accessed, e.g., from local cache, from other types of memory and/or a database. The accessing can include using the received indication of the occurrence of the alarm to identify a notification plan that is associated with the alarm within a cache of notification plans. For example, in an example implementation that utilizes an event messaging paradigm, active notification plans can be pulled from a database and cached locally. Further, subscriptions can be made to those machines/measurements specified in the notification plan for changes as well as events (e.g., alarm occurrences). When an event identifier (e.g., event message) is received indicating the occurrence of the alarm, the associated plan is found within the cache and the associated plan is marked with a timestamp of when a notification should be sent. The event identifier can also be saved.

In some implementations, if the indication of the occurrence of the alarm is an event identifier, the event identifier can be used to query an alarm event database for additional information regarding the alarm (e.g., alarm type, level, and the like). The additional information regarding the alarm can be utilized to query a database of notification plans to retrieve the notification plan associated with the current alarm.

The notification plan can specify parameters for contacting a user in response to the occurrence of the alarm. In some implementations, the notification plan can specify a time delay. The time delay can include a length of time that further processing of the notification should be delayed before providing a notification. For example, if the time delay is 1 hour, then upon occurrence of an alarm, a delay of 1 hour can be implemented before notifying (e.g., by providing a text, email, and the like) the user of the alarm. During this time delay, additional sensor measurements can be performed, which can then be provided to the user with the notification. By utilizing a time delay, some implementations of a condition monitoring system can increase the information available to a user for assessing a cause and solution to the condition that raised the alarm. This can allow the user to efficiently and effectively resolve problems of the machine.

The notification plan can specify additional aspects (e.g., parameters) of the notification. For example, the notification plan can specify a recipient of the notification such as an email address, telephone number, file path (e.g., for saving the notification), and the like. The notification plan can specify at least one applicable alarm type and at least one applicable alarm level. The applicable alarm type and alarm level can indicate alarms for which a notification should be provided, and/or indicate alarms for which a notification should not be provided. The at least one applicable alarm type can include machine type and/or instrumentation type. The at least one applicable alarm level can include a level 1 alarm, a level 2 alarm, a level 3 alarm, and/or a level 4 alarm. Other type and level values are possible.

The notification plan can specify a notification suppression time, which can indicate a length of time that notifications should not be sent if there a first notification was provided and there subsequently is a repeat alarm (a subsequently triggered alarm that is the same alarm [e.g., the same alarm condition is met]). Notification suppression can be useful, for example, because a same measurement can go into and out of alarm (e.g., "chattering"). Thus, notification suppression can be useful to silence "chattering" alarms.

The notification plan can specify predefined visualizations for inclusion in the notification. The visualizations can be of, or relate to, the measurements taken by the sensor of the machine. For example, the visualization can include a plot of vibration versus time showing the operation of the machine before and after the alarm triggered. The plot can include sensor data (and/or another metric derived from sensor data) showing operation of the machine after the alarm triggered for a period of time that is similar to (e.g., of an order with) the time delay. For example, if the time delay is 1 hour, about or approximately 1 hour of sensor data measured after the alarm triggered can be included in the visualization.

The notification plan can specify alarm states for canceling the notification. In some instances, alarms can be in one of several states including "cleared", "acknowledged", and "shelved". In some implementations, after the time delay has elapsed, the current state of the alarm can be determined and if the current state of the alarm is "cleared" "shelved", or "acknowledged" then the notification can be canceled and no notification is provided. This can prevent notifications from being sent for alarms that have already been addressed, suppressed, or otherwise managed by an engineer. By delaying processing of the alarm and then determining the state of the alarm, the number of alarms that the user needs to address can be reduced.

At 130, a notification can be generated after elapse of at least the time delay. In some implementations, the generating can be in response to determining that the alarm is active. In some implementations, upon determining that the alarm state is not active after elapse of the time delay, further processing of the notification can be cancelled and no notification can be provided.

In some implementations, a programming loop can be utilized that checks if any notification plan has been marked to send a notification. If the plan has been marked and the time to send the notification has been reached, the event can be fetched using the event identifier and a notification can be generated using that event information.

In some implementations, generating the notification can include generating at least one predetermined visualization. The visualization can characterize sensor measurements related to machine operation before and after a time point in which the alarm was triggered. For example, the visualization can include a plot of vibration versus time showing the operation of the machine before and after the alarm triggered. Generating at least one predetermined visualization can include executing predefined functions that analyze sensor data and create the visualization. Predetermined visualizations can be based on the type of alarm that is triggered. For example, if the alarm was monitoring a reciprocating compressor, a different type of visualization can be included than if the alarm was monitoring a centrifugal compressor.

At 140, the notification can be provided according to the notification plan. The providing can include transmitting the notification using email or text message (e.g., SMS, MMS, and the like). In some implementations, providing the notification can include saving or storing the notification. For example, the notification can be saved to the file path specified in the notification plan.

The provided notification can include the visualization characterizing sensor measurements related to machine operation before and after a time point in which the alarm was triggered. By delaying processing of the notification by the time delay, additional sensor measurements can be taken after the alarm is triggered. These additional measurements can be provided in the visualization to an engineer (e.g., via the notification) to provide the engineer with additional data context. Thus delaying notification of the alarm allows for additional data aggregation and analysis of machine operation after the event that triggered the alarm, which increases the information available to a user for assessing a cause and solution to the condition that raised the alarm. This can allow the user to efficiently and effectively resolve problems of the machine.

Figure 2:
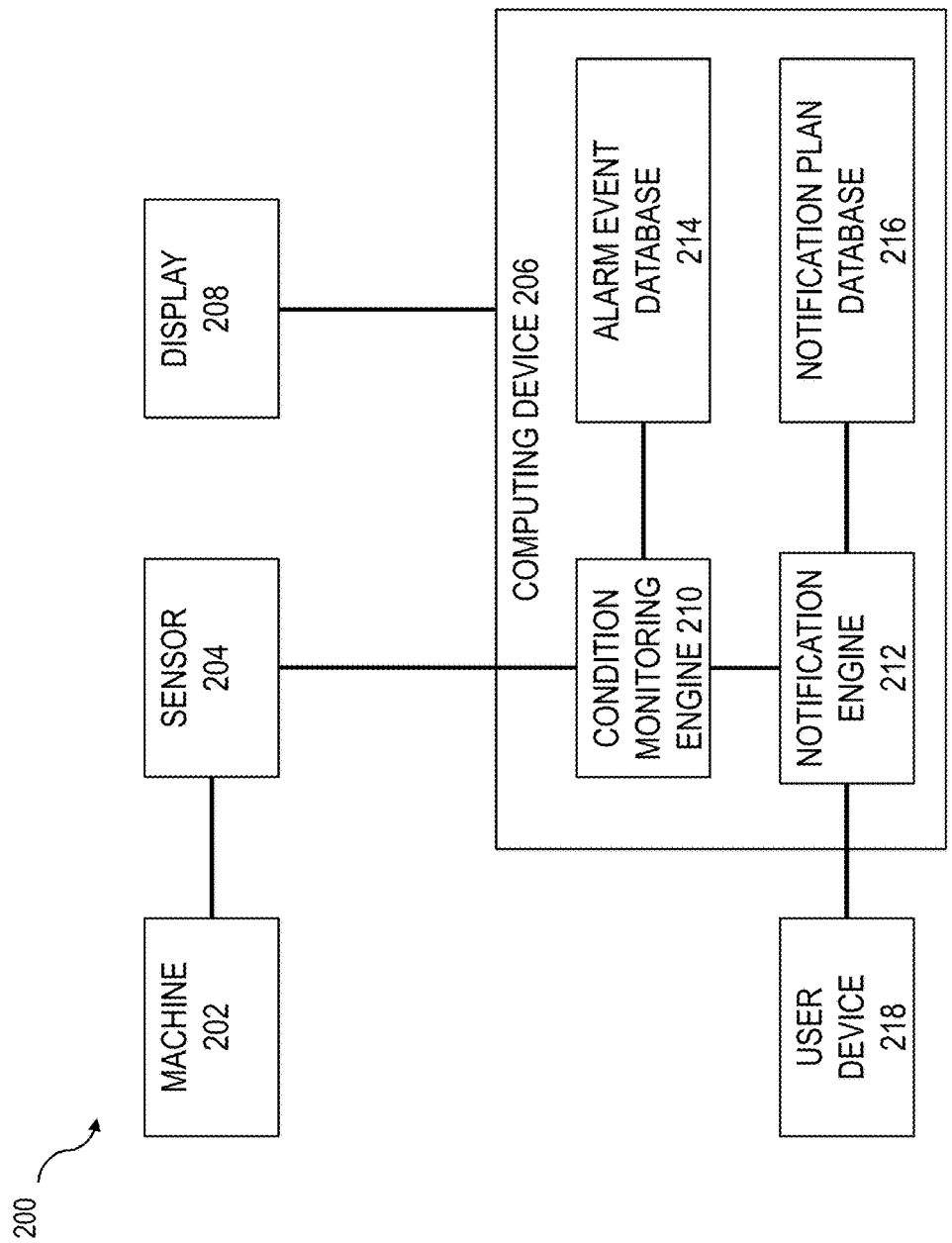
FIG. 2 is a system block diagram of an example machine monitoring system with delayed notification.

FIG. 2 is a system block diagram of an example machine monitoring system 200 with delayed notification. The system 200 can include a machine 202 (e.g., turbine, motor, and the like), a sensor 204 (e.g., accelerometer, position sensor, proximitor, and the like), a computing device 206 (e.g., laptop, mobile phone, and the like), and a display 208. The sensor 204 can detect operational information of the machine 202 and can relay the detected information to the computing device 206. The computing device 206 can receive and save this information, and can visually present the information on a graphical display space of the display 208.

The computing system 206 can include a condition monitoring engine 210, notification engine 212, alarm event database 214, and notification plan database 216. In some implementations, the computing system 206 can be in operative communication (e.g., via a network), with a user device 218. The condition monitoring engine 210 can monitor the sensor data and generate alarms when predetermined alarm conditions are met. In some implementations, the condition monitoring engine 210 can graphically present the alarms on the graphical display space. Notifications can be provided via other channels than the display (e.g., via SMS text, email, and the like).

The alarm event database 214 can include a database or table of alarm events and associated property information. For example, the alarm database can include, for example, fields for operational state identifier, alarm activity, alarm level, alarm type, and alarm source. Values of one or more of the fields can be set based on the operation of the machine (e.g., transition from one operational state to another). The operational state identifier field can be indicative of the operational state (e.g., machine-off state, startup-shutdown (SUSD) state, running state, and the like) associated with the alarm data structure. The alarm activity field can indicate the current state of the alarm (e.g., cleared, active, shelved, and the like).

The notification engine 212 can manage notification plans and generate delayed notifications in response to receiving an indication of an occurrence of an alarm. The notification plan database 216 can include a database or table of notification plans. The notification plans can be previously specified by a user.

In operation, the condition monitoring engine 210 can receive the sensor data acquired by sensor 204 and process and monitor the data to determine whether one or more predefined alarm conditions are met. When one of the predefined alarm conditions are met (e.g., vibration exceeds a threshold), condition monitoring engine 210 can trigger an alarm by generating an event ID and creating an entry in the alarm event database 214. The entry in the alarm event database 214 can specify properties of the alarm, such as the alarm type, level, state, and the like. The notification engine 212 can monitor the alarm event database 214 (e.g., for events that it has subscribed to based on the configuration of the notification plans. The notification engine 212 can receive the indication of the occurrence of the alarm. In some implementations, the indication is in the form of the event ID.

The notification engine 212 can access the notification plan database 216 and retrieve a notification plan associated with the alarm occurrence. The notification plan can specify parameters for contacting a user in response to the occurrence of the alarm including a time delay. The notification engine 212 can delay by waiting a period of time and then further processing the notification after at least the time delay. After the time delay, the notification engine 212 can determine a state of the alarm by accessing the alarm event database 214 and reading a state field associated with the event ID. If the alarm is no longer active, the notification can be canceled. If the alarm is active, then the notification engine can generate, after elapse of the time delay, a notification. The notification can be generated according to the notification plan. Generating the notification can include generating visualizations characterizing the sensor data before and after a time when the alarm triggered. The notification engine 212 can provide the generated notification by, e.g., email, SMS text, and the like.

Figure 3:
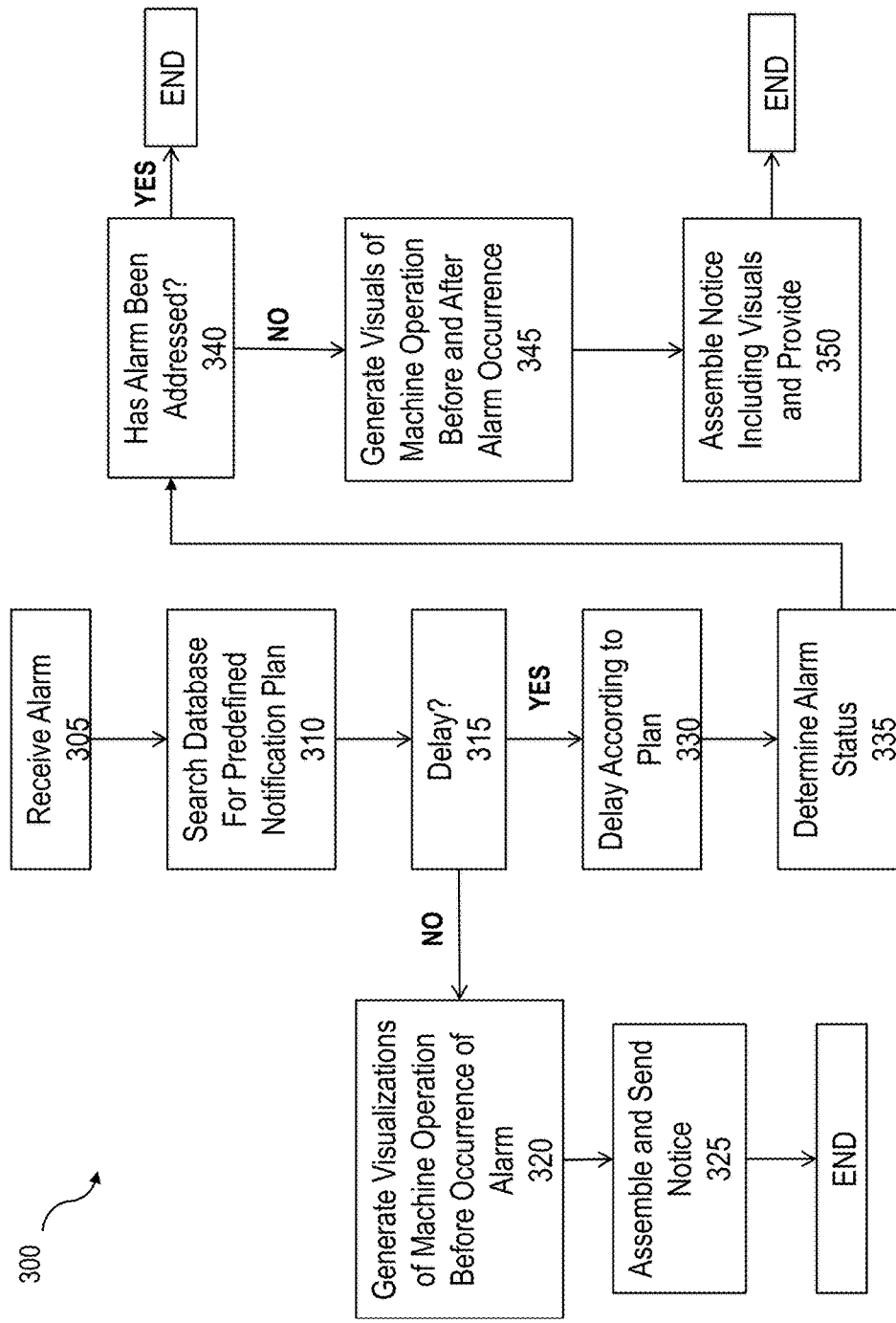
FIG. 3 is a process flow diagram illustrating an example process of providing delayed notifications according to some implementations.

FIG. 3 is a process flow diagram illustrating an example process 300 of providing delayed notifications according to some implementations. At 305, data can be received indicating an occurrence of an alarm in an industrial machine monitoring system. At 310, a database can be accessed to retrieve a predefined notification plan associated with the occurrence of the alarm. At 315, whether the predefined notification plan includes a time delay can be determined. If no time delay is specified or a time delay of zero is specified, visualizations characterizing the sensor data and machine operation before the occurrence of the alarm can be generated at 320. The notification can be generated and provided at 325, after which the process 300 can end.

In the event that the notification plan specifies a time delay, then at 330, further processing of the notification is delayed according to the notification plan. Delaying can include waiting until elapse of the time delay. At 335, a current state or status of the alarm can be determined. At 340, whether the alarm has been addressed (e.g., cleared, shelved, etc.) can be determined. If the alarm has been addressed and the notification plan specifies that the notification is to be canceled if the alarm has been addressed, the process 300 can end. If the alarm has not been addressed, at 345 visuals of machine operation before and after the time that the alarm triggered can be generated. At 350, the notification including the visuals can be assembled and provided, after which the process 300 can end.

Figure 4:
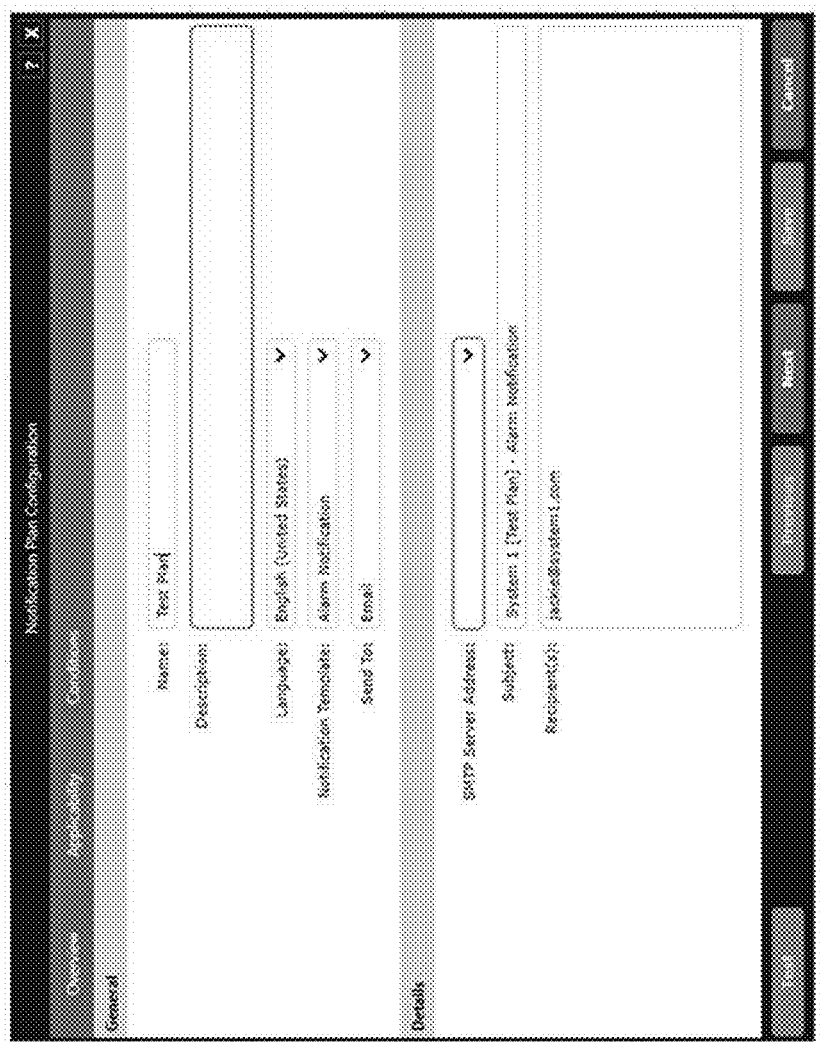
FIG. 4 is a view of an example graphical user interface for configuring a notification plan with delayed notification according to some implementations in which an overview tab is illustrated.

FIG. 4 is a view of an example graphical user interface for configuring a notification plan with delayed notification according to some implementations in which an overview tab 400 is illustrated. The graphical user interface can include fields for specifying a notification plan name (e.g., for management and future editing), and an email recipient including SMTP server address, subject line, and email addresses.

Figure 5:
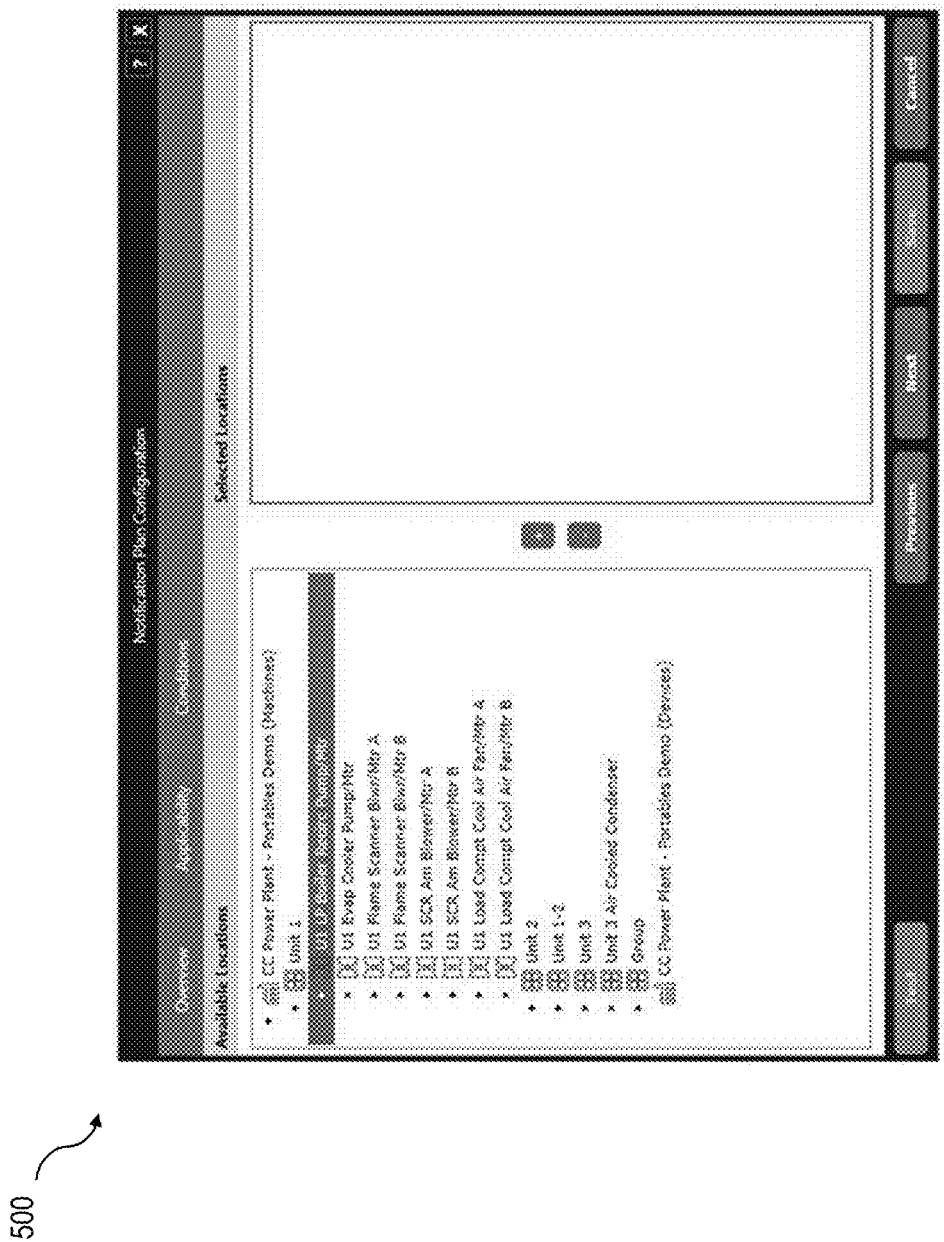
FIG. 5 is a view of the example graphical user interface for configuring the notification plan with delayed notification according to some implementations in which the applicability tab is illustrated.

FIG. 5 is a view of the example graphical user interface for configuring the notification plan with delayed notification according to some implementations in which the applicability tab 500 is illustrated. Available machines and monitoring devices that are being monitored and are available for notification generation in response to an alarm being triggered can be listed on the left, for example. A user can select which machines the notification plan should apply to.

Figure 6:
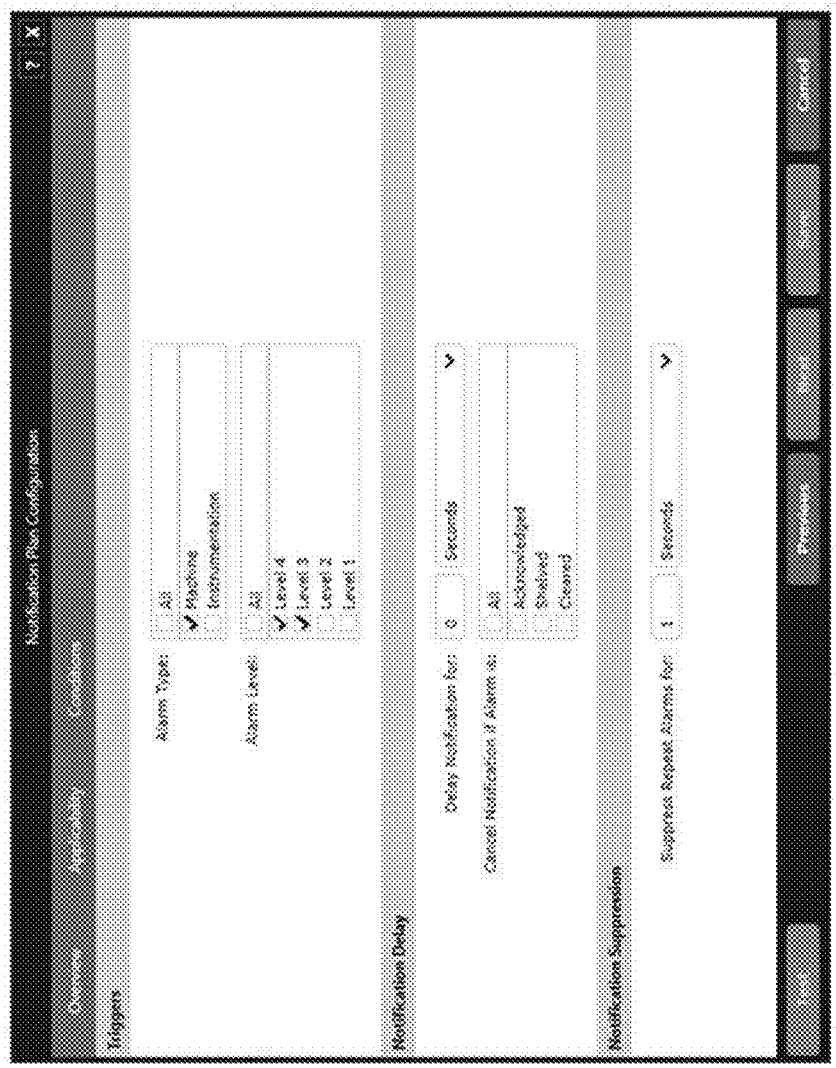
FIG. 6 is a view of the example graphical user interface for configuring the notification plan with delayed notification according to some implementations in which the conditions tab is illustrated.

FIG. 6 is a view of the example graphical user interface for configuring the notification plan with delayed notification according to some implementations in which the conditions tab 600 is illustrated. A user can specify the applicable alarm types (e.g., all, machine, instrumentation) and alarm levels (e.g., all, level 4, level 3, level 2, level 1). A user can further specify the notification time delay and which states should result in a canceled notification if the alarm is in the specified state after the time delay has elapsed. A user can further specify whether and for how long to suppress repeat alarms.

Figure 7:
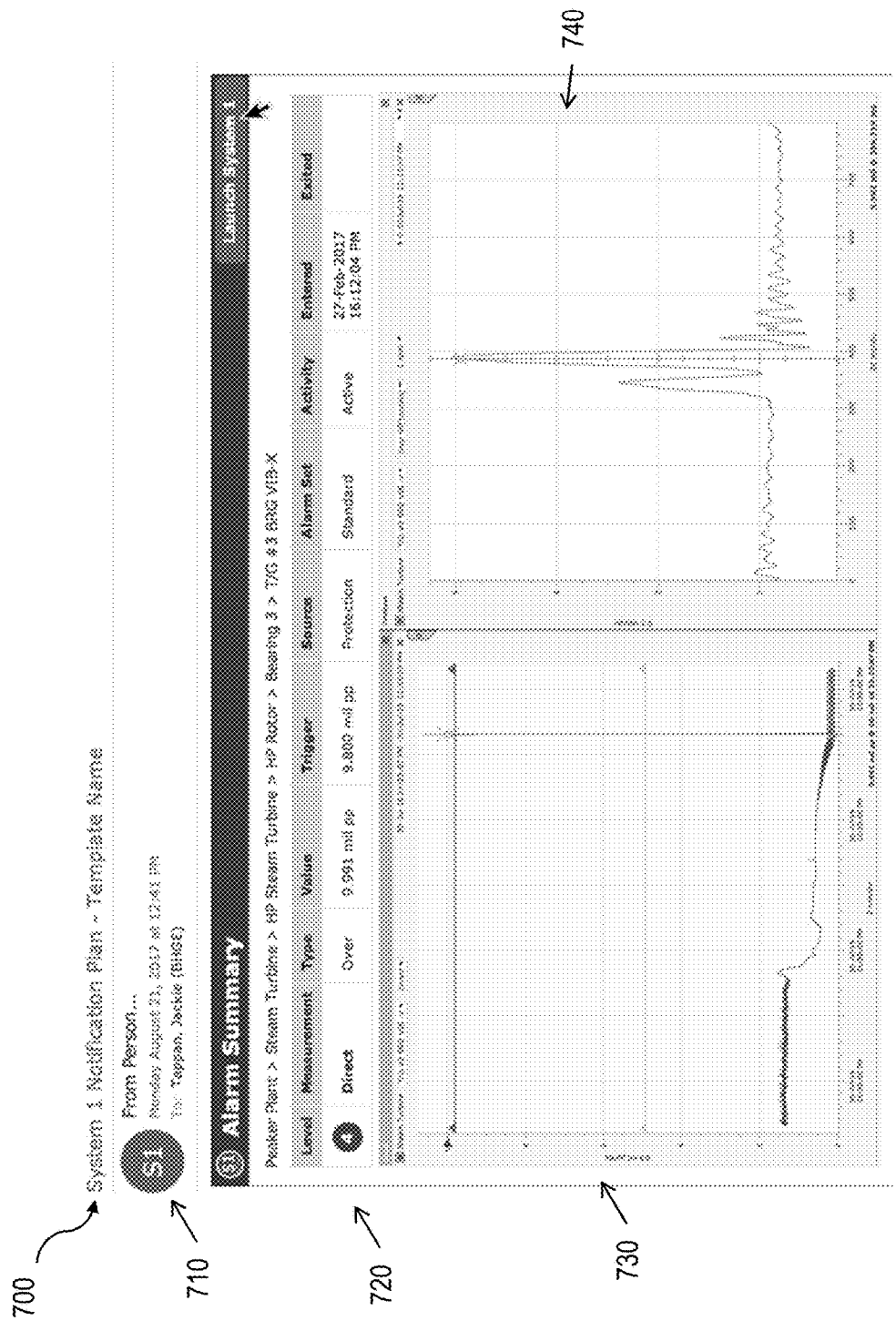
FIG. 7 is a view of an example delayed notification including visualization in the form of an email.

FIG. 7 is a view of an example delayed notification 700 including visualization in the form of an email. The notification includes a header 710, the alarm parameters 720, and visualizations 730, 740. The header 710 includes the date, from: field, and to: field. The alarm parameters 720 include the monitored component name with hierarchy (e.g., "T/G #3 BRG VIE-X," which is part of a bearing within a steam turbine forming part of peaker plant), alarm level, alarm measurement, alarm type, alarm value, alarm trigger, alarm source, alarm set, activity, time entered, and time exited. The visualizations 730, 740 illustrate characterizations of sensor measurements of the monitored machine over time. Sensor measurements taken both before and after the triggering of the alarm can be used to generate the visualizations 730, 740. Delaying notification of the alarm allows for this additional data aggregation and analysis of machine operation after the event that triggered the alarm, which increases the information available to a user for assessing a cause and solution to the condition that raised the alarm. This can allow the user to efficiently and effectively resolve problems of the machine.

In some implementations, an alarm can indicate various attributes (e.g., vibration rate of the machine) associated with the operation of a machine. For example, and referring again to FIG. 2, alarms can provide benchmarks (e.g., maximum/minimum threshold values) that can be used to detect anomalous behavior in the operational parameters of the machine 202. Because the operation of a machine can vary based on the operational state of the machine, the benchmarks for detection of anomalous behavior can change with the operational state. For example, a machine can have higher vibration when it is turned on (e.g., "startup state") compared to when its operations have stabilized after it has been running for a while (e.g., "running state"). Therefore, an acceptable vibration threshold for the startup state can be higher than an acceptable vibration threshold for the running state. Hence, alarms can be operational state dependent.

In some implementations, an alarm can include several alarm properties such as an operational state identifier, alarm activity, alarm level, alarm type, and alarm source. An operational state identifier property can indicate a predetermined identifier to which the alarm has been assigned. When the machine is in a given operational state, the computing device 206 can select an alarm from a set of alarms designated to the given operational state. Alarms for one operational state of a machine may not be useful in monitoring the machine in a second operational state. As the machine transitions from a first operational state to a second operational state, the alarms associated with the first operational state can be suppressed (also referred to as "shelved"). If the machine re-enters the operational state associated with a suppressed alarm at a later time, the suppressed alarm can be activated. Activation of a shelved alarm can involve, for example, reversing the changes made to the visual presentation and activity value of the alarm during shelving.

In some implementations, alarm activity can be indicative of the current state of the alarm. For example, if an alarm has exited the alarm condition, the alarm activity can be set to a predetermined value (e.g., "cleared") indicating that the alarm is no longer active. If an alarm has not cleared and the machine is in the operational state associated with the alarm, the alarm activity value can be set to a second predetermined value (e.g., "active"). If an alarm has not cleared and the machine is not in the operational state associated with the alarm, the alarm activity value can be set to a third predetermined value (e.g., "shelved"), which can indicate that the alarm has been suppressed. When the machine reenters the operational state for which a suppressed alarm exists, the suppressed alarm can be activated and its alarm activity value can be set to "active." Alternately, if it is determined, upon reentering the operational state that the shelved alarm is no longer needed (e.g., if the operating parameters do not fall in the range that would trigger the suppressed alarm), the alarm can be exited.

In some implementations, an alarm source can be related to the capabilities of the alarm. If the alarm can be configured to monitor the operation of a machine (e.g., machine 202 which is monitored by the system 200), it can be referred to as having a "condition monitoring" alarm source. The alarm activity for alarms with a condition monitoring alarm source can be set as described above (e.g., set to "cleared," "shelved," "active," and the like). On the other hand, alarms that have been configured to shut-down the machine rather than warn/notify a user can be referred to as having a "protection" alarm source. As alarms set by protection alarm sources are more critical, they can remain active as long as they continue to exceed configured operating parameters, regardless of current operational state (e.g., set to "cleared", or "active").

In some implementations, another property of an alarm can be an alarm type that can be related to the manner in which the alarm can be triggered. For example, if an alarm event occurs when one or more values of the operational parameter exceeds the alarm threshold, the alarm can be characterized by an "over" alarm type. If an alarm event occurs when one or more values of the operational parameter is less than the alarm threshold, the alarm can be characterized by an "under" alarm type. If an alarm event occurs when one or more values of the operational parameter falls in a range of alarm threshold values, the alarm can be characterized by an "out of band" alarm type.

In some implementations, an alarm level can be indicative of the severity of the alarm. The degree of severity can be indicated, for example, by a number. For example, an alarm with higher severity can be assigned a higher numerical value compared to an alarm with lower severity. Alarms of varying severity can be presented using different colors. Several alarms having different alarm levels can be assigned to an operational state. An alarm type can indicate that the alarm represents an "over" alarm type, an "under" alarm type, or "out of band" alarm type. An alarm source can indicate the capabilities of the alarm and can represent "condition monitoring" or "protection" alarm source.

Although a few variations have been described in detail above, other modifications or additions are possible. For example, in some implementations, regardless of activity state of the alarm, the user can mark it as "reviewed" by acknowledging it, which can serve as another way to manage and cancel the notification.

The subject matter described herein provides many technical advantages. For example, in some implementations, with the inclusions of a plot image within the notification, delaying the notification can ensure that more data context is included with the notification. This can allow the user to determine if the issue is "real" and whether to take action within the machine monitoring system. In some implementations, notification delay can help a user to focus on the alarms and issues that matter. In some implementations, the user may not be burdened by notifications for alarms that have already been managed. In addition, when notifications are sent, more data context can be made available to assess and manage the issue.

In some implementations, delayed notifications can enable an improved machine monitoring system interface in which a user can interact with the machine monitoring system in a more efficient and effective manner.

Certain exemplary embodiments are described to provide an overall understanding of the principles of the structure, function, manufacture, and use of the systems, devices, and methods disclosed herein. One or more examples of these embodiments are illustrated in the accompanying drawings. The systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    receiving data indicating an occurrence of an alarm in an industrial machine monitoring system, the alarm triggered in response to machine operation satisfying a condition;
    accessing a notification plan associated with the alarm, the notification plan specifying parameters for contacting a user in response to the occurrence of the alarm, the notification plan specifying a time delay;
    generating, after elapse of at least the time delay, a notification, wherein the generating is performed according to the notification plan and includes generating at least one predefined visualization specified in the notification plan, the at least one visualization characterizing sensor measurements related to machine operation before and after a time point in which the alarm was triggered; and
    providing the notification.

2. The method of claim 1, further comprising delaying processing of the notification by at least the time delay.

3. The method of claim 1, wherein providing the notification includes transmitting the notification via email, transmitting the notification via text message, or storing the notification in memory.

4. The method of claim 1, wherein the industrial machine monitoring system includes a sensor and computing device, the sensor coupled to and observing operational information of a machine and relaying the observed operational information to the computing device for storage and analysis, the computing device comparing the operational information to predefined alarm trigger conditions and generating the alarm in response to the operational information satisfying at least one of the alarm trigger conditions.

5. The method of claim 1, further comprising:
    determining, after an elapse of time that is at least the time delay, a state of the alarm;
    wherein the generating the notification is in response to determining that the alarm is active.

6. The method of claim 1, wherein the notification plan specifies:
    a recipient of the notification;
    at least one applicable alarm type;
    at least one applicable alarm level;
    a notification suppression time;
    predefined visualizations for inclusion in the notification;
    alarm states for canceling the notification; and
    the time delay.

7. The method of claim 6, wherein the recipient of the notification includes an email address, a telephone number, or a file path;
  wherein the at least one applicable alarm type includes machine type and instrumentation type;
  wherein the at least one applicable alarm level includes a level 1 alarm, a level 2 alarm, a level 3 alarm, and a level 4 alarm; and
  wherein the alarm states for canceling the notification includes acknowledged, shelved, and cleared.

8. A system comprising:
  at least one data processor;
  memory storing instructions which, when executed by the at least one data processor, causes the at least one data processor to perform operations comprising:
  receiving data indicating an occurrence of an alarm in an industrial machine monitoring system, the alarm triggered in response to machine operation satisfying a condition;
  accessing a notification plan associated with the alarm, the notification plan specifying parameters for contacting a user in response to the occurrence of the alarm, the notification plan specifying a time delay;
  generating, after elapse of at least the time delay, a notification, wherein the generating is performed according to the notification plan and includes generating at least one predefined visualization specified in the notification plan, the at least one visualization characterizing sensor measurements related to machine operation before and after a time point in which the alarm was triggered; and
  providing the notification.

9. The system of claim 8, the operations further comprising delaying processing of the notification by at least the time delay.

10. The system of claim 8, wherein providing the notification includes transmitting the notification via email, transmitting the notification via text message, or storing the notification in memory.

11. The system of claim 8, wherein the industrial machine monitoring system includes a sensor and computing device, the sensor coupled to and observing operational information of a machine and relaying the observed operational information to the computing device for storage and analysis, the computing device comparing the operational information to predefined alarm trigger conditions and generating the alarm in response to the operational information satisfying at least one of the alarm trigger conditions.

12. The system of claim 8, the operations further comprising:
  determining, after an elapse of time that is at least the time delay, a state of the alarm;
  wherein the generating the notification is in response to determining that the alarm is active.

13. The system of claim 8, wherein the notification plan specifies:
  a recipient of the notification;
  at least one applicable alarm type;
  at least one applicable alarm level;
  a notification suppression time;
  predefined visualizations for inclusion in the notification;
  alarm states for canceling the notification; and
  the time delay.

14. The system of claim 13, wherein the recipient of the notification includes an email address, a telephone number, or a file path;
  wherein the at least one applicable alarm type includes machine type and instrumentation type;
  wherein the at least one applicable alarm level includes a level 1 alarm, a level 2 alarm, a level 3 alarm, and a level 4 alarm; and
  wherein the alarm states for canceling the notification includes acknowledged, shelved, and cleared.

15. A non-transitory computer program product storing instructions,
  which when executed by at least one data processor of at least one computing system, implement operations comprising:
  receiving data indicating an occurrence of an alarm in an industrial machine monitoring system, the alarm triggered in response to machine operation satisfying a condition;
  accessing a notification plan associated with the alarm, the notification plan specifying parameters for contacting a user in response to the occurrence of the alarm, the notification plan specifying a time delay;
  generating, after elapse of at least the time delay, a notification, wherein the generating is performed according to the notification plan and includes generating at least one predefined visualization specified in the notification plan, the at least one visualization characterizing sensor measurements related to machine operation before and after a time point in which the alarm was triggered; and
  providing the notification.

* * * * *